Patented Nov. 7, 1944

2,362,326

UNITED STATES PATENT OFFICE 2,362,326

AROMATIC GLYCERYL ESTERS OF ALPHA-HYDROXYISOBUTYRIC ACIDS

Jack T. Thurston, Cos Cob, and John M. Grim, Stamford, Conn., assignors to American Cyanamid Company, New York, N. Y., a corporation of Maine No Drawing. Application November 6, 1940, Serial No. 364,552

6 Claims. (Cl. 260—484)

The present invention relates to a new class of chemical compounds comprising the aromatic glyceryl esters of alpha-hydroxyisobutyric acid and the hydroxy substituted derivatives thereof.

This invention includes broadly compounds in which the hydrogen of the carboxyl group in alpha-hydroxyisobutyric acid is replaced by an aromatic glyceryl radical and in which the hydrogen of the alpha-hydroxyl radical may be replaced by an aliphatic, cycloaliphatic, aromatic or heterocyclic radical. Either the glyceryl mono- or di-aromatic ethers may be used for producing the esters of the present invention, for example, glyceryl aromatic ethers have been found to be suitable for carrying out the present invention, alpha-glyceryl phenyl ether, alpha, gamma-glyceryl diphenyl ether, alpha-glyceryl naphthyl ether, alpha, gamma-glyceryl dinaphthyl ether, as well as the above compounds when the aromatic ring contains substituent groups such as for example alpha-glyceryl cresyl ether, alpha, gamma-glyceryl dicresyl ether, and the like.

These new compounds have a wide field of usefulness of considerable commercial importance in the arts. Most of the compounds are rather viscous liquids having relatively high boiling points and are useful as plasticizers for cellulose derivatives, as modifying agents for amino-formaldehyde and phenol-formaldehyde resins, textile softeners, and as modifiers in lacquers, inks, and various coating compositions.

The compounds of the present invention are esters and may, in general, be prepared by any of the methods ordinarily employed in the production of esters and the invention is not intended to be limited by any particular method for producing. We have found that good yields are obtained by reacting the glyceryl aromatic ethers, such as for example, alpha-phenyl ether with alpha-hydroxyisobutyric acid at an elevated temperature in the presence of a catalyst such as p-toluenesulfonic acid.

When compounds are to be produced in which the hydrogen of the hydroxyl group is replaced by some other radical, it may be desirable in some instances to produce the aromatic glyceride first, and then replace the hydrogen of the hydroxyl group with an organic radical such as for example, an acyl radical, and in other cases it may be desirable to replace the hydrogen of the hydroxyl group with an acyl group prior to the production of the ester.

Among the various acyl radicals that can be used to replace the hydrogen of the hydroxyl group are the aliphatic acyl radicals such as formyl, acetyl, propionyl, butyryl, octanoyl and carbonic.

The acyl radical may also be that of a cycloaliphatic acid such as cyclohexyl acetic acid, camphoric acid and the like. The acyl radical may likewise be an aromatic radical such as those of benzoic acid or salicylic acid. Dicarboxylic acids may also be used to acylate the hydroxyl groups in which case two molecules of alpha-hydroxyisobutyric acid are combined with one molecule of the dicarboxylic acid, or the mono-esters of the dicarboxylic acids may be employed in which case one molecule of alpha-hydroxyisobutyric acid will combine with one molecule of the mono-ester of the dicarboxylic acid. Among the various dicarboxylic acids and mono-esters which can be used are those such as succinic, oxalic, diglycolic, sebacic, maleic, naphthalene dicarboxylic, phthalic, chlorophthalic, nitrophthalic, and the like. The following ether-acids may also be employed to produce acylated aromatic glycerides of alpha-hydroxyisobutyric acid:

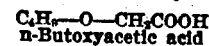
n-Butoxyacetic acid

(Beta-n-butoxyethoxy) acetic acid

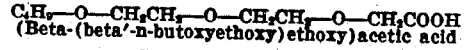
(Beta-(beta'-n-butoxyethoxy)ethoxy)acetic acid

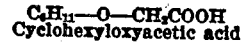
Cyclohexyloxyacetic acid

(Beta-n-butoxyethoxy)benzoic acid

(Beta-n-butoxyethoxy)ethoxy propionic acid

The hydrogen of the hydroxyl group may also be replaced by heterocyclic acids under certain conditions such as for example the radical of nicotinic acid.

As pointed out heretofore the hydrogen of the hydroxyl group may be replaced by an acyl radical either prior to the production of the aromatic glyceride of alpha-hydroxyisobutyric acid or the ester may be prepared first and then the hydroxyl group acylated. In most cases the acid halides may be used to replace the hydrogen of the hydroxyl groups as for example acetyl chloride may be used to produce alpha-acetylated aromatic glycerides.

Ethers of the aromatic glycerides of alpha-hydroxyisobutyric acid are produced when the hydrogen of the alpha-hydroxyl group in alpha-hydroxyisobutyric acid is replaced by either an alkyl, cycloaliphatic, aralkyl, or aryl group and such ethers of aromatic glycerides of alpha-hydroxyisobutyric acid have properties differing somewhat from the aromatic glycerides themselves. The alkyl radicals used to replace the hydrogen may be either saturated or unsaturated and may or may not contain substituent groups. Included in this group of alkyl radicals are the methyl, ethyl, propyl, butyl, isobutyl, octyl, as well as alkyl radicals containing carboxylic and oxy groups in the chain to produce compounds such as the following in which R' represents a glyceryl aromatic ether radical:

and

R'.O₂C.C(CH₃)₂.O.CH₂CH₂OCH₂CH₂.O.C(CH₃)₂.CO₂.R'

The hydrogen of the alpha-hydroxyl group may also be replaced by alicyclic radicals such as cyclohexanyl, methyl cyclohexanyl, etc. The various aralkyl radicals may be also used to replace the hydrogen of the alpha-hydroxyl group present in alpha-hydroxyisobutyric acid such as benzyl, phenylethyl, phenylpropyl, naphthylmethyl, diphenylmethyl, diphenylethyl, cinnamyl, etc.

The hydrogen of the hydroxyl group present in the aromatic diglycerides and the glyceryl diaromatic ethers may be replaced by any of the aliphatic or aromatic radicals mentioned above by reacting the sodium salt of the aromatic glycerides of alpha-hydroxyisobutyric acid with the desired aliphatic or aromatic halides or sulfates. In some cases the ethers of the mono-aromatic mono-glycerides of alpha-hydroxyisobutyric acid

as well as the two above types of glycerides may be obtained by reacting the alpha-alkoxyisobutyryl chloride with the desired glyceryl aromatic ether.

The hydrogen of the hydroxyl group present in the alpha-hydroxyisobutyric acid may also be replaced by groups possessing ketone or aldehyde radicals. For example, halogenated ketones may be reacted with the sodium salt of the aromatic glycerides of alpha-hydroxyisobutyric acid to split off sodium chloride and substitute the ketone radical in place of the hydrogen of the hydroxyl group. For example, when chloroacetone is reacted as described above the following compound is produced:

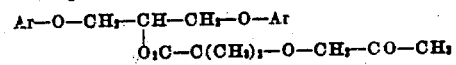

The corresponding aromatic ketones may be used instead of acetone. When chlorinated aldehydes are employed the aldehyde radical replaces the hydrogen in the hydroxyl group.

The carbonic acid esters of the aromatic glycerides of alpha-hydroxyisobutyric acid can be prepared by reacting the aromatic glyceride with, for example, ethyl chloroformate to produce the alpha-carbethoxy aromatic glyceride

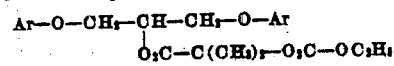

Various metal radicals may be used to replace the hydrogen on the hydroxy group of the esters and particularly active metals such as the alkali metals sodium and potassium. These salts are produced by adding sodium or potassium to the aromatic glycerides of alpha-hydroxyisobutyric acid in an inert solvent and refluxing. In some cases it is more desirable to prepare the sodium or potassium salts by reacting the aromatic ester of alpha-hydroxyisobutyric acid with the metallic alkoxides in an inert solvent such as toluene and remove the alcohol by distillation.

The invention will be further described in conjunction with the following specific examples but they are for the purpose of illustration only and the invention is not strictly limited to the exact conditions therein set forth.

EXAMPLE 1

Phenyl glyceryl di-alpha-hydroxyisobutyrate

| Materials | Mols | Grams |
|---|---|---|
| Alpha-glyceryl phenyl ether | 0.2 | 23.6 |
| Alpha-hydroxyisobutyric acid | 0.5 | 51.6 |
| p-Toluenesulfonic acid | 0.004 | 0.76 |

The above reaction mixture was heated at 160–170° C. for seven hours during which time 4 cc. of water was removed by reducing the pressure from time to time. A carbon tetrachloride solution of the residue was neutralized with sodium bicarbonate, washed several times with water and dried with anhydrous sodium sulfate. After the carbon tetrachloride had been removed the product was distilled at reduced pressure. The yield of the phenyl diglyceride boiling at 187–205° C./1–2 mm. and having a saponification number of about 300, was 47 g. or 69% of the theoretical.

EXAMPLE 2

Diphenyl glyceryl alpha-hydroxyisobutyrate

| Materials | Mols | Grams |
|---|---|---|
| Alpha, gamma-glyceryl diphenyl ether | 0.2 | 44 |
| Alpha-hydroxyisobutyric acid | 0.3 | 31 |
| p-Toluenesulfonic acid | 0.0026 | 0.5 |

The above reaction mixture was heated at a temperature of 160–170° C. for five hours during which time about 2.5 cc. of water was removed by reducing the pressure from time to time. A carbon tetrachloride solution of the residue was prepared and neutralized with sodium bicarbonate, washed several times with water and then dried over anhydrous sodium sulfate. The product which was soluble in carbon tetrachloride, was distilled at reduced pressure yielding 43 g. or about 71% of the theoretical yield of the alpha,gamma-diphenyl glyceride which boiled at 186–199° C./1–2 mm. and on standing the heavy oily product completely solidified.

EXAMPLE 3

Cresyl glyceryl mono-alpha-hydroxyisobutyrate

| Materials | Grams | Mols |
|---|---|---|
| Glyceryl mono-cresyl ether | 200 | 1.1 |
| Alpha-hydroxyisobutyric acid | 104 | 1.0 |
| p-Toluenesulfonic acid | 1.9 | 0.01 |

This reaction mixture was heated under reflux at 170° C. for four hours, during which time 17 cc. of water was removed by reducing the pressure from time to time. A carbon tetrachloride solution of the residue was neutralized with sodium bicarbonate, washed with water several times and finally dried over anhydrous sodium sulfate. The carbon tetrachloride was removed and the product distilled at reduced pressure. The yield of the cresyl monoglyceride, boiling at 190–195° C. at less than 1 mm. and having a saponification number of about 191 was 207 g. or 77% of the theoretical yield.

EXAMPLE 4

Cresyl glyceryl di-alpha-hydroxyisobutyrate

| Materials | Grams | Mols |
|---|---|---|
| Glyceryl mono-cresyl ether | 91.0 | 0.5 |
| Alpha-hydroxyisobutyric acid | 114.4 | 1.1 |
| p-Toluenesulfonic acid | 1.9 | 0.01 |

The above reaction mixture was heated for four hours at 170° C. during which time 15 cc. of water was removed by reducing the pressure occasionally. A carbon tetrachloride solution of the residue was neutralized with sodium bicarbonate, washed several times with water and dried with anhydrous sodium sulfate. Fractionation at reduced pressure gave 112 g. or 63% of the theoretical yield of the cresyl diglyceride which was a viscous straw-colored product boiling at 190-195° C./2 mm.

EXAMPLE 5

Dicresyl glyceryl alpha-hydroxyisobutyrate

| Materials | Mols | Grams |
|---|---|---|
| Glyceryl dicresyl ether | 1.0 | 272 |
| Alpha-hydroxyisobutyric acid | 1.25 | 130 |
| p-Toluenesulfonic acid | 0.013 | 2.5 |

This was heated under reflux at 175° C. for three hours. The pressure was reduced from time to time removing 17 cc. of water. A carbon tetrachloride solution of the residue was neutralized with sodium bicarbonate, washed with water several times and dried over anhydrous sodium sulfate. It was then fractionated at reduced pressure. The yield of the yellow viscous dicresyl glyceride boiling at 190-195° C./3 mm. having a saponification number of about 154 was 269 g. or 77.5% of the theoretical.

EXAMPLE 6

Acetyl derivative of alpha,gamma-dicresyl glyceryl alpha-hydroxyisobutyrate

To 36 parts of alpha,gamma-dicresyl glyceryl alpha-hydroxyisobutyrate dissolved in 200 parts of dry toluene was added 12 parts of acetyl chloride. This reaction mixture was slowly heated to refluxing temperature and maintained at that temperature for two hours. At the end of this time hydrogen chloride was no longer evolved. The solvent and excess acetyl chloride were removed by reduced pressure distillation leaving a viscous and slightly colored product which had a saponification number of 284.

In the foregoing examples it is to be understood that the alpha-hydroxyisobutyric acid may be replaced in all or in part by hydroxy substituted derivatives of alpha-hydroxyisobutyric acid to produce the corresponding aromatic glycerides. Suitable hydroxy substituted compounds include those in which the hydrogen of the hydroxyl group is replaced by an alkyl radical such as ethyl, an aromatic radical such as phenyl, a cycloaliphatic radical such as cyclohexyl, a heterocyclic radical such as tetrahydrofurfuryl bromide or an alkali metal and especially acyl radicals such as acetyl or carbethoxy, and the examples are not intended to limit this invention and any modification or variation therefrom which conforms to the spirit of the invention is intended to be included within the scope of the claims.

We claim:

1. Compounds having the following formula:

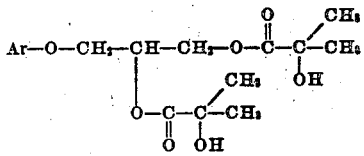

in which Ar represents an aryl radical.

2. The compound di-alpha-hydroxyisobutyric acid ester of monophenyl glyceryl ether.

3. The compound alpha-hydroxyisobutyric acid ester of α,β diphenyl glyceryl ether.

4. The compound mono-alpha-hydroxyisobutyric acid ester of monocresyl glyceryl ether.

5. Compounds having the general formula

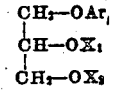

in which Ar is an aryl radical, and $X_1$ and $X_2$ are members of the group consisting of hydrogen, aryl radicals, and the group

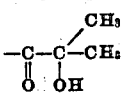

at least one of the symbols $X_1$ and $X_2$ representing the radical

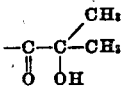

6. Compounds having the general formula

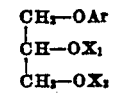

in which Ar is an aryl radical, $X_1$ is an aryl radical, and $X_2$ is the radical

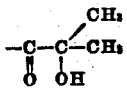

JACK T. THURSTON.
JOHN M. GRIM.